(12) United States Patent
Kim

(10) Patent No.: US 9,010,622 B2
(45) Date of Patent: Apr. 21, 2015

(54) SYSTEM AND METHOD FOR DELIVERING INFORMATION USING IMAGE CODE

(75) Inventor: Dong Wook Kim, Seongnam-si (KR)

(73) Assignee: NHN Corporation, Gyeonggi-do (KR)

( * ) Notice: Subject to any disclaimer, the term of this patent is extended or adjusted under 35 U.S.C. 154(b) by 28 days.

(21) Appl. No.: 13/303,586

(22) Filed: Nov. 23, 2011

(65) Prior Publication Data

US 2012/0125995 A1    May 24, 2012

(30) Foreign Application Priority Data

Nov. 23, 2010  (KR) .................. 10-2010-0116741

(51) Int. Cl.
*G06F 17/00* (2006.01)
*G06F 17/30* (2006.01)

(52) U.S. Cl.
CPC ................................ *G06F 17/30879* (2013.01)

(58) Field of Classification Search
CPC ............. G06F 17/30; G06F 17/30861; G06F 17/30876; G06F 17/30879
USPC ................... 235/375, 462.01, 472.01–472.03
See application file for complete search history.

(56) References Cited

U.S. PATENT DOCUMENTS

| | | | | |
|---|---|---|---|---|
| 5,905,248 A | * | 5/1999 | Russell et al. | 235/462.15 |
| 5,938,727 A | * | 8/1999 | Ikeda | 709/218 |
| 7,124,953 B2 | | 10/2006 | Anttila et al. | |
| 7,387,250 B2 | * | 6/2008 | Muni | 235/462.01 |
| 8,403,222 B2 | * | 3/2013 | Kindberg et al. | 235/462.45 |
| 2004/0118923 A1 | * | 6/2004 | Creamer et al. | 235/462.01 |
| 2008/0245870 A1 | * | 10/2008 | Lee et al. | 235/462.01 |
| 2010/0219234 A1 | * | 9/2010 | Forbes | 235/375 |

FOREIGN PATENT DOCUMENTS

| | | |
|---|---|---|
| JP | 2007-251718 | 9/2007 |
| KR | 10-2006-0030927 | 4/2006 |
| KR | 1020060080354 | 7/2006 |
| KR | 10-2008-0047728 | 5/2008 |
| KR | 10-2010-0041584 | 4/2010 |

* cited by examiner

*Primary Examiner* — Seung Lee
(74) *Attorney, Agent, or Firm* — Harness, Dickey & Pierce, P.L.C.

(57) ABSTRACT

A system and method for delivering information using an image code. A first system for handing over to a second system an operation being performed by the first system includes an image code generation unit to generate the image code using a uniform resource locator (URL) of a webpage; and a display control unit to control the image code to be displayed via a display device. The image code is photographed by the second system and input to the second system in the form of an image file, and the URL is extracted from the image code in the second system so that the webpage is displayed in the second system.

21 Claims, 7 Drawing Sheets

SYSTEM AND METHOD FOR DELIVERING INFORMATION USING IMAGE CODE

CROSS-REFERENCE TO RELATED APPLICATION

This application claims priority from and the benefit of Korean Patent Application No. 10-2010-0116741, filed on Nov. 23, 2010, which is hereby incorporated by reference for all purposes as if fully set forth herein.

BACKGROUND OF THE INVENTION

Field of the Invention

Exemplary embodiments of the present invention relate to a system and method for delivering information using an image code.

DISCUSSION OF THE BACKGROUND

If a user intends to run an operation, generally a web operation, being performed in a first system in a second system, processes necessary for the operation, in most cases, may need to be performed repeatedly to run the operation in the second system.

As an example, a user who accessed a website B through a portal site A and visited a webpage C included in the website B to research product information using a personal computer (PC) may want to continuously track the same product information through a smart phone. In this case, when the user does not know a uniform resource locator (URL) of the website B or the webpage C, the user needs to repeat accessing the portal site A through the smart phone, accessing the website B through the portal site A, and then visiting the webpage C included in the website B, so as to continue watching the product information. When the user knows the URL of the website B or the webpage C, the user needs to input the corresponding URL through an input unit of the smart phone constantly.

As another example, while listening to an audio source through a webpage E included in a website D by accessing the website D through a portal site A using a PC, a user may want to continuously listen to the same audio source through a smart phone. In this case, when the user does not know a URL of the website D or the webpage E, the user needs to repeat accessing the portal site A, accessing the website D through the portal site A, and then visiting the webpage E included in the website D, so as to continuously listen to the corresponding audio source through the webpage E.

Also, in the middle of using a map service or watching a video, a user may want to perform the same operation continuously in another system. However, the user may need to directly input relevant information or repeat most processes performed in an initial system to run the corresponding operation in the other system.

Accordingly, a system and method for efficiently changing a terminal for performing a desired operation will be suggested.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide a system and method for handing over an operation between systems using an image code such as a quick response (QR) code.

Exemplary embodiments of the present invention also provide a system and method for handing over an operation between systems of a user, by generating and exposing an image code using a uniform resource locator (URL) of a webpage exposed through a web browser in one system, and extracting the URL through the image code by photographing the image code to display the webpage.

Exemplary embodiments of the present invention also provide a system and method that generate an image code using information for identifying an operation in progress in one system, provide the image code to another system, and extract information for identifying the operation from the image code provided by the other system, such that the operation performed in one system may be performed in the other system.

Additional features of the invention will be set forth in the description which follows, and in part will be apparent from the description, or may be learned by practice of the invention.

An exemplary embodiment of the present invention discloses a system for handing over an operation being performed to another system, the system including an image code generation unit to generate an image code using a uniform resource locator (URL) of a webpage, and a display control unit to control the image code to be displayed via a display device, wherein the image code may be photographed by the other system and input to the other system in the form of an image file, and the URL may be extracted from the image code in the other system so that the webpage is displayed in the other system.

An exemplary embodiment of the present invention also discloses a system to be handed over an operation being performed in another system, the system including a photograph unit to generate and store an image photographed from an image code in the form of an image file, the image code exposed through a display device of the other system, an image code analysis unit to analyze the image code from the image in the form of the image file and thereby extract information including at least a uniform resource locator (URL), and a webpage display unit to display a webpage corresponding to the URL, wherein the image code may be generated using the URL of the webpage in the other system and displayed via the display device of the other system.

An exemplary embodiment of the present invention also discloses a system for handing over an operation being performed to another system, the system including an image code generation unit to generate an image code using information for identifying the operation, wherein the image code may be provided to the other system, and the operation may be performed in the other system using information for identifying the operation.

An exemplary embodiment of the present invention also discloses a system to be handed over an operation being performed in another system, the system including an image code analysis unit to extract information for identifying the operation by analyzing an image code, and an operation control unit to control the operation to be performed using the extracted information, wherein the image code may be generated in the other system using the information for identifying the operation.

An exemplary embodiment of the present invention also discloses a method of handing over an operation being performed to another system, the method including generating an image code using a URL of a webpage, and controlling the image code to be displayed via a display device, wherein the image code may be photographed by the other system and input to the other system in the form of an image file, and the URL may be extracted from the image code in the other system so that the webpage is displayed in the other system.

An exemplary embodiment of the present invention also discloses a method to be handed over an operation being performed in another system, the method including generating and storing an image photographed from an image code in the form of an image file, the image code exposed through a display device of the other system, analyzing the image code from the image in the form of the image file and thereby extracting information including at least a uniform resource locator (URL), and displaying a webpage corresponding to the URL, wherein the image code may be generated using the URL of the webpage in the other system and displayed via the display device of the other system.

An exemplary embodiment of the present invention also discloses a method of handing over an operation being performed to another system, the method including generating an image code using information for identifying the operation, wherein the image code may be provided to the other system, and the operation may be performed in the other system using the information for identifying the operation.

An exemplary embodiment of the present invention also discloses a method to be handed over an operation being performed in another system, the method including extracting information for identifying the operation by analyzing an image code, and controlling the operation to be performed using the extracted information, wherein the image code may be generated in the other system using the information for identifying the operation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and along with the description serve to explain the principles of the invention.

DETAILED DESCRIPTION OF THE ILLUSTRATED EMBODIMENTS

Figure 1:
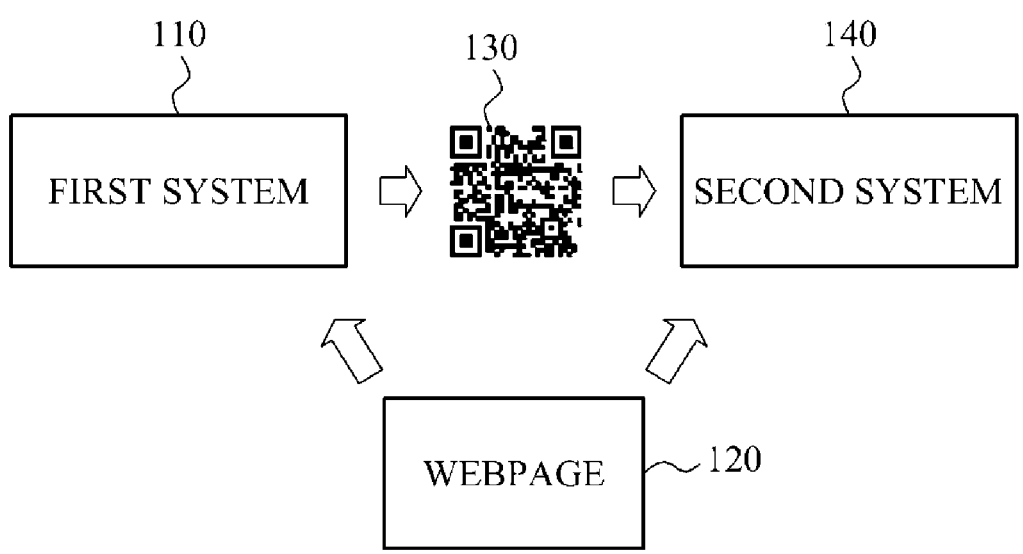
FIG. 1 is a diagram illustrating two different systems and an image code, according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

According to exemplary embodiments of the present invention, an operation may be handed over between systems using a 2-dimensional (2D) image code such as a quick response (QR) code or an image of a text hyperlink.

According to exemplary embodiments of the present invention, an image code is generated using a URL of a webpage in one system and exposed. The image code is photographed by another system so that the URL is extracted, and the webpage is displayed. Therefore, an operation may be handed over between systems for a user.

According to exemplary embodiments of the present invention, an image code is generated using information for identifying an operation in progress in one system, and the image code is provided to another system. Information for identifying the operation is extracted from the image code provided by the other system, such that the operation performed in one system may be performed in another system.

FIG. 1 is a diagram illustrating two different systems and an image code, according to an exemplary embodiment of the present invention. FIG. 1 shows a first system 110, a webpage 120, an image code 130, and a second system 140.

A user may be provided with services for reading news articles, listening to audio sources, watching video, searching maps, and the like, by gaining access to a certain webpage, for example the webpage 120, through the first system 110. When the user wants to be provided with the same service through the second system 140, the user needs to access the webpage 120 in the second system 140 using a uniform resource locator (URL) of the webpage 120. However, the first system 110 may generate an image code using the URL of the webpage 120 and display the image code through a display device, so that the user, who may not even know the URL, may easily access the webpage 120 through the second system 140 and continuously use the same service.

For example, the first system 110 may be equipped with an application in advance, the application to generate an image code using the URL of the webpage 120 currently exposed to the user and to display the image code through a display device of the first system 110. That is, when the user generates a predetermined user event, the first system 110 may generate an image code which includes information on the URL of the webpage 120 using the application and display the image code through the display device.

The user may photograph the image code displayed on the display device using a photographing device of the second system 140. The second system 140 may obtain the URL of the webpage 120 by analyzing the image code input in the form of an image file using the photographing device, and may display the webpage 120, using the URL, directly to the user. Therefore, the user may use the service used in the first system continuously through the second system, without having to constantly input the URL or search for the webpage 120 in the second system 140.

For example, presuming that the user has to go out while reading a news article or listening to an audio source via a personal computer (PC) at home, the user may continuously use the same service such as the news article or the audio source, using a URL of an image code in a smart phone, simply by generating a specific event in the PC and photographing the image code displayed on a monitor of the PC.

In addition, when the first system 110 generates an image code, the image code may include not only the URL but also information on which part of the news article, the audio source, or the video is being displayed or played. In this case, the corresponding part of the news article, the audio source, or the video may be displayed or played in the second system 140.

That is, information for identifying the operation being performed in the first system 110 needs to determine an identification level with respect to the operation. For example, the first system 110 may include only the information on the URL accessed by the user in the image code, or further include information on a content currently used by the user among contents included in the URL in the image code. Furthermore, the first system 110 may determine a specific part of the content currently used by the user and further include information on details of the content in the image code. The identification level may be determined directly by the user automatically or by setting up an application according to types of the contents or service used by the user. In addition, for example, a default value may be used so that only the information on the URL is included the image code.

The image code may be a 2-dimensional (2D) code such as a quick response (QR) code or a "Maxi code." Since the image code and an image code generation method are generally known in the art, a detailed description will be omitted.

A QR code is provided as an example of an image code, however other image transfer technology may be used, such as an image of a text hyperlink. For example, the text hyperlink may be generated in the first system 110 and a photograph taken of the text hyperlink in the second system 120. The image of the text hyperlink may be an image code and analyzed by the second system 140.

Figure 2:
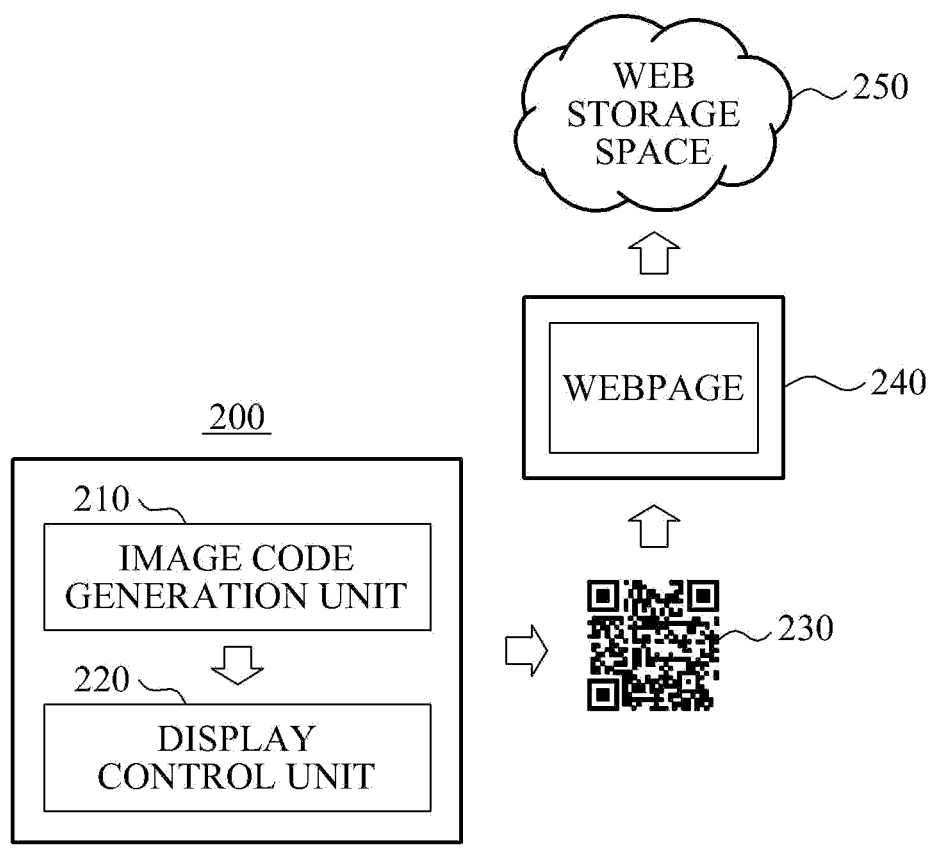
FIG. 2 is a block diagram illustrating a system to hand over an operation being performed to another system, according to an exemplary embodiment of the present invention.

FIG. 2 is a block diagram illustrating a system 200 to hand over an operation being performed to another system, according to an exemplary embodiment of the present invention. The system 200 may correspond to the first system 110 described with reference to FIG. 1, and may include an image code generation unit 210 and a display control unit 220 as shown in FIG. 2. FIG. 2 further shows an image code 230, another system 240, and a web storage space 250. Here, the other system 240 may correspond to the second system 140 described with reference to FIG. 1.

The image code generation unit 210 generates an image code 230 using a URL of a webpage being exposed through a web browser. The display control unit 220 controls the image code 230 to be displayed via a display device. That is, using the image code generation unit 210, the system 200 may determine that the user is using a service of a webpage being exposed through a web browser and extract the URL of the corresponding webpage. Also, using the URL, the system 200 may generate the image code 230 including at least the URL. In addition, the system 200 may control the display control unit 220 to control the display device so that the image code 230 is displayed to the user. Here, the user may photograph the image code 230 displayed on the display device, using a photographing device of the other system 240. That is, the image code 230 may be input in the form of an image file to the other system 240. In this case, the URL may be extracted from the image code 230 in the other system 240, and the corresponding webpage may be displayed to the user through a display device of the other system 240. Therefore, the user may continue the operation performed through the system 200, without having to dedicatedly input the URL or search for the corresponding webpage again in the other system 240.

In addition, at least one data of text, an image, an audio source, a video, and connect information included in the webpage displayed in the other system 240 may be stored in a web storage space 250 related to the user through the other system 240. In this case, the user may use the data stored in the web storage space 250 at any time without accessing the corresponding webpage using the system 200 and the other system 240. Also, the user may certainly use the data stored in the web storage space 250 through any systems accessible to the Internet.

Figure 3:
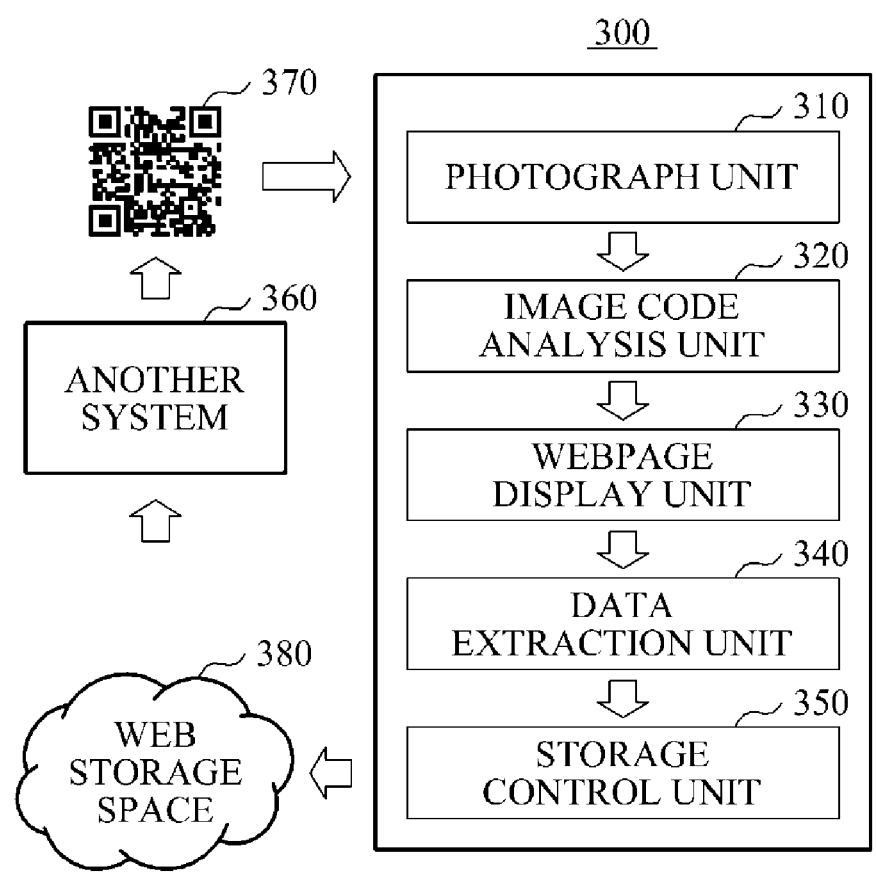
FIG. 3 is a block diagram illustrating a system to be handed over an operation being performed in another system, according to an exemplary embodiment of the present invention.

FIG. 3 is a block diagram illustrating a system 300 to be handed over an operation being performed in another system, according to an exemplary embodiment of the present invention. The system 300 may correspond to the second system 140 of FIG. 1. As shown in FIG. 3, the system 300 includes a photograph unit 310, an image code analysis unit 320, a webpage display unit 330, a data extraction unit 340, and a storage control unit 350. Here, the data extraction unit 340 and the storage control unit 350 may be selectively included in the system 300. FIG. 3 further illustrates another system 360, an image code 370, and a web storage space 380.

The image code 370 may be exposed through the display device of the other system 360 and the photograph unit 310 may generate and store an image photographed from the image code 370 in the form of an image file. Here, the other system 360 may correspond to the first system 110 illustrated in FIG. 1 or the system 200 illustrated in FIG. 2. That is, when the image code 370 including a URL of a webpage is generated and displayed in relation to an operation performed by the user in another system 360, the user may photograph the image code 370 using a photographing device of the system 300. Here, the photograph unit 310 may generate and store the photographed image in the form of an image file.

The image code analysis unit 320 may extract information including at least the URL by analyzing the image code 370 from the image photographed in the form of the image file. Here, when the image code 370 is analyzed to obtain information on the URL, processes such as identifying of the image code 370 from the image file and analyzing of the image code may be necessary. Since those processes may be performed using at least one of well-known methods, a detailed description on the methods will be omitted for conciseness.

The webpage display unit 330 may display the webpage corresponding to the URL. That is, since the image code 370 includes the URL of a webpage used by the user in the other system 360, the system 300 may be handed over the operation performed by the user in the other system 360, by displaying the webpage using the URL extracted from the image code 370.

The data extraction unit 340 may extract at least one data of text, an image, an audio source, a video, and map information included in the webpage. The storage control unit 350 may control the at least one data to be stored in the web storage space 380 related to the user. Accordingly, the user may use the data stored in the web storage space 380 in the system 300, the other system 360, and any other systems accessible to the Internet.

Figure 4:
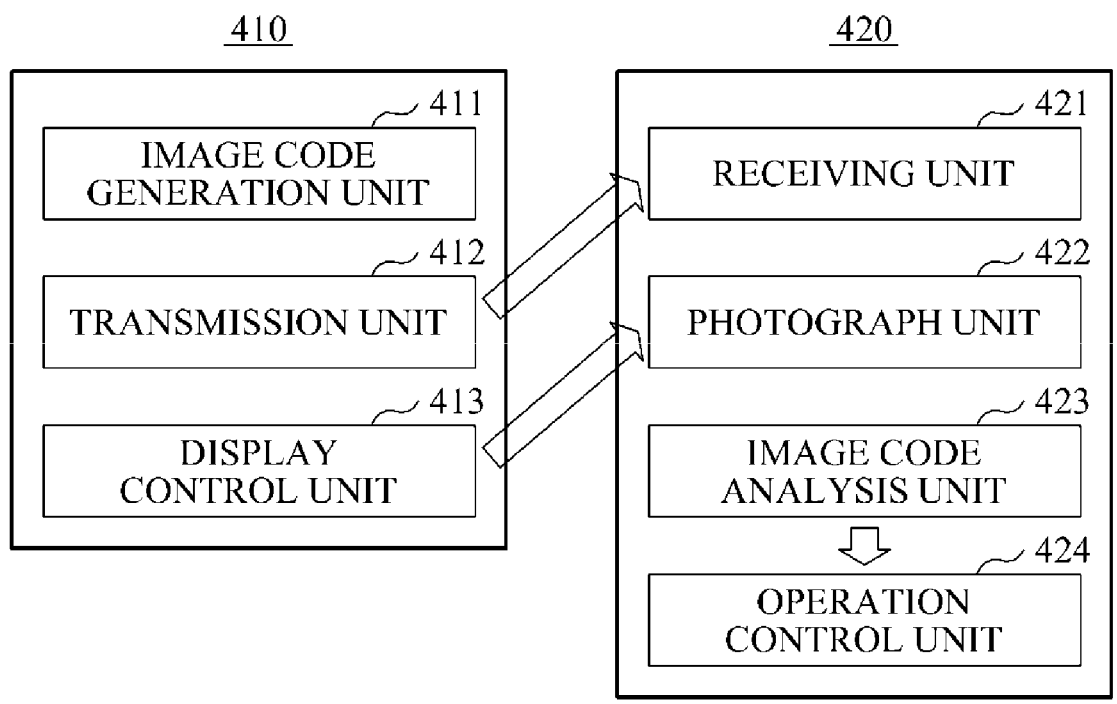
FIG. 4 is a block diagram illustrating an inner structure of systems to hand over an operation, according to an exemplary embodiment of the present invention.

FIG. 4 is a block diagram illustrating an inner structure of systems to hand over an operation, according to an exemplary embodiment of the present invention. A first system 410 according to the present exemplary embodiment may include an image code generation unit 411, a transmission unit 412, and a display control unit 413 as shown in FIG. 4. The first system 410 may selectively include one or both of the transmission unit 412 and the display control unit 413.

The second system 420 may include a receiving unit 421, a photograph unit 422, an image code analysis unit 423, and an operation control unit 424, as shown in FIG. 4. Here, the second system 420 may selectively include one or both of the receiving unit 421 and the photograph unit 422.

The first system 410 may denote a system in which the user is currently performing the operation. The second system 420 may denote a system to be handed over (receive) the operation.

In the first system 410, the image code generation unit 411 may generate an image code using information for identifying the operation. As aforementioned, the information for identifying the operation may determine an identification level with respect to the operation. For example, the identification level of the information for identifying the operation may include three levels as follows.

(1) Level 1: The URL of the webpage currently displayed is extracted, and used as the information for identifying the operation.

(2) Level 2: The URL of the webpage currently displayed and information for identifying a content or service used by the user among contents and services of the webpage are extracted, and used as the information for identifying the operation.

(3) Level 3: The URL of the webpage currently displayed, the information for identifying a content or service used by the user among contents and services of the webpage, and information for identifying a currently used part of the corresponding content or service are extracted, and used as the information for identifying the operation.

However, the three foregoing types of levels are suggested only by way of example. That is, fewer levels or additional levels may be defined as necessary. For example, information for retrieving the corresponding webpage, such as "view: http://www.xxx.com," or information for retrieving an image of the corresponding webpage, such as "image:http://www.xxx.com," may be further included.

In addition to information for simply retrieving the corresponding content, information on an operation to be performed by the user may be included in the image code directly. For example, information for extracting and storing an image or a video from the corresponding webpage, for example in the form of "image:http://www.xxx.com/a.jpg" or "movie:http://www.xxx.com/b.mov," may be included in the image code. Also, the image code may further include information for determining whether to store the extracted image or video in the second system 420 or in the web storage space related to the user, as the information for identifying the operation.

A range of the information for identifying the operation may be determined by setting up the aforementioned application or determined automatically according to the content or service currently used by the user.

Furthermore, although only a web operation has been explained so far, an offline operation such as a simple word-processor operation may also be applied. For example, in case of an operation of drawing a simple document, an image code may be generated to include information on contents of the document along with information on a type of a word processor.

As aforementioned, the image code generated in the first system 410 may be transmitted to the second system 420 in various manners. For this, the first system 410 may include at least one of the transmission unit 412 to transmit the image code to the second system 420 and the display control unit 413 to control the image code to be displayed via a display device. That is, the first system 410 may transmit the image code directly to the second system 420 or, as described with reference to FIGS. 1 to 3, only display the image code via the display device so that the image code is input to the second system 420 by the photographing device of the second system 420. In addition, the image code may be stored in the web storage space, as necessary, related to the user so that the second system 420 receives the image code from the web storage space and uses the image code.

Accordingly, the second system 420 may include at least one of the receiving unit 421 to receive the image code from the first system 410, and the photograph unit 422 to generate and store, in the form of an image file, an image photographed from the image code exposed through the display device of the first system 410. However, as described in the foregoing, the second system 420 may receive the image code from the web storage space related to the user.

Here, the image code analysis unit 423 may extract the information for identifying the operation by analyzing the image code. The operation control unit 424 may control the operation to be performed using the extracted information. According to the preceding example, the image code analysis unit 423 may extract the information for identifying the operation, such as "image:http://www.xxx.com" or "movie:http://www.xxx.com/b.mov," and the operation control unit 424 may display an image of a corresponding website or extract and store a video of a corresponding website.

In this case as well, at least one data of text, an image, an audio source, a video, and map information related to the operation may be stored in the web storage space related to the user by the second system 420. For this, the second system 420 may further include a storage control unit (not shown) that controls the at least one data to be stored in the web storage space related to the user.

Figure 5:
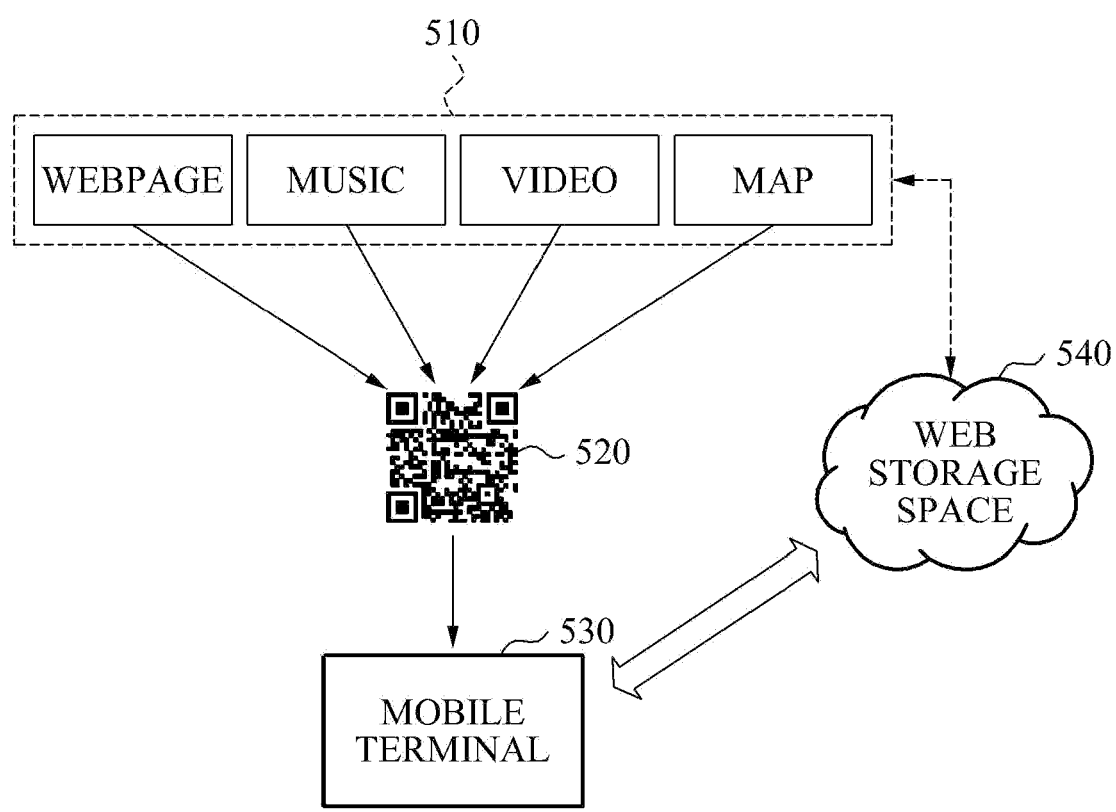
FIG. 5 is a diagram illustrating an example of using a web storage space for handover of an operation, according to an exemplary embodiment of the present invention.

FIG. 5 is a diagram illustrating an example of using a web storage space for handover of an operation according to an exemplary embodiment of the present invention. An identifier with respect to various contents or services 510 provided through the web, such as a webpage, music, a video, a map, and the like, may be generated as an image code 520, and the image code may be input to a mobile terminal 530 of a user, such as a smart phone. Here, the mobile terminal 530 may extract a URL and the like by analyzing the image code 520, and extract at least one data of text, an image, an audio source, a video, and map information and store the at least one data in a web storage space 540 related to the user. Here, the at least one data stored in the web storage space 540 may certainly be used in the mobile terminal 530 as long as the mobile terminal 530 has access to the Internet, as well as other systems that have access to the Internet. The contents or services 510 may be extracted by not only a terminal generating the image code 520 but also any other terminals accessible to the Internet, and stored in the web storage space 540.

Figure 6:
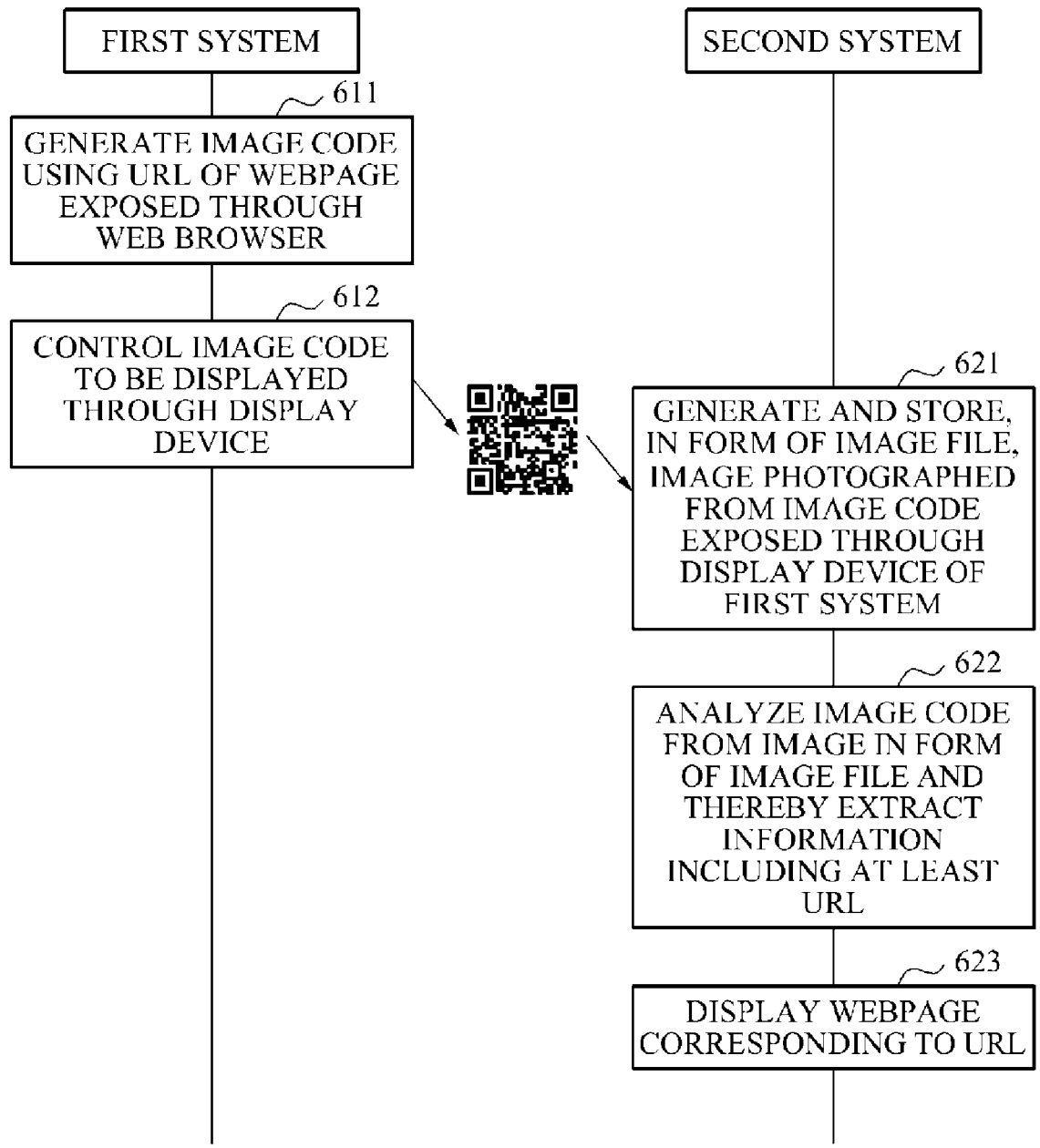
FIG. 6 is a flowchart illustrating a method of handing over an operation between systems using a uniform resource locator (URL), according to an exemplary embodiment of the present invention.

FIG. 6 is a flowchart illustrating a method of handing over an operation between systems using a URL according to an exemplary embodiment of the present invention. In particular, FIG. 6 shows a method of handing over an operation between two systems, that is, a first system and a second system.

In operation 611, the first system generates an image code using a URL of a webpage exposed through a web browser. In operation 612, the first system controls the image code to be displayed via a display device. That is, through the operation 611, the first system may determine that the user is currently using a service of the webpage exposed through the web browser, accordingly extracting the URL of the corresponding webpage, and may generate the image code including at least the URL, using the URL. In addition, by way of the operation 612, the first system may control the display device so that the image code is exposed to the user.

Here, the user may photograph the image code displayed on the display device using a photographing device of the second system. That is, the image code may be input to the second system in the form of an image file.

In operation 621, when the image code displayed on the display device of the first system is photographed, the second system may generate and store an image photographed from the image code in the form of the image file. That is, when the user generates and displays the image code including the URL of the webpage in relation to the operation being performed in the first system, the user may photograph the image code using the photographing device of the second system. Here, the second system may generate and store the photographed image in the form of the image file. Although the user generates and displays the image code including the URL of the webpage in relation to the operation being performed in the first system and the user may photograph the image code using the photographing device of the second system, the handing over operation is not intended to be so limited, and another user may photograph the image code using the photographing device of the second system according to exemplary embodiments.

In operation 622, the second system may analyze the image code from the image photographed in the form of the image file, accordingly extracting information including at least the URL. Here, when information on the URL is obtained through analysis of the image code, processes such as identifying of the image code from the image file and analyzing of the image code may be necessary. Since those processes may be performed using at least one of well-known methods, a detailed description on the methods will be omitted for conciseness.

In operation 623, the second system displays the webpage corresponding to the URL. That is, since the image code includes the URL of the webpage currently used by the user in the first system, the second system may be handed over the operation currently being performed by the user in the first system, by displaying the URL extracted from the image code through the webpage.

In addition, the second system may extract at least one data of text, an image, an audio source, a video, and map information included in the webpage, and control the at least one data to be stored in the web storage space related to the user. Therefore, the user may use the data stored in the web storage space in not only the second system and the first system but also any other systems accessible to the Internet.

Figure 7:
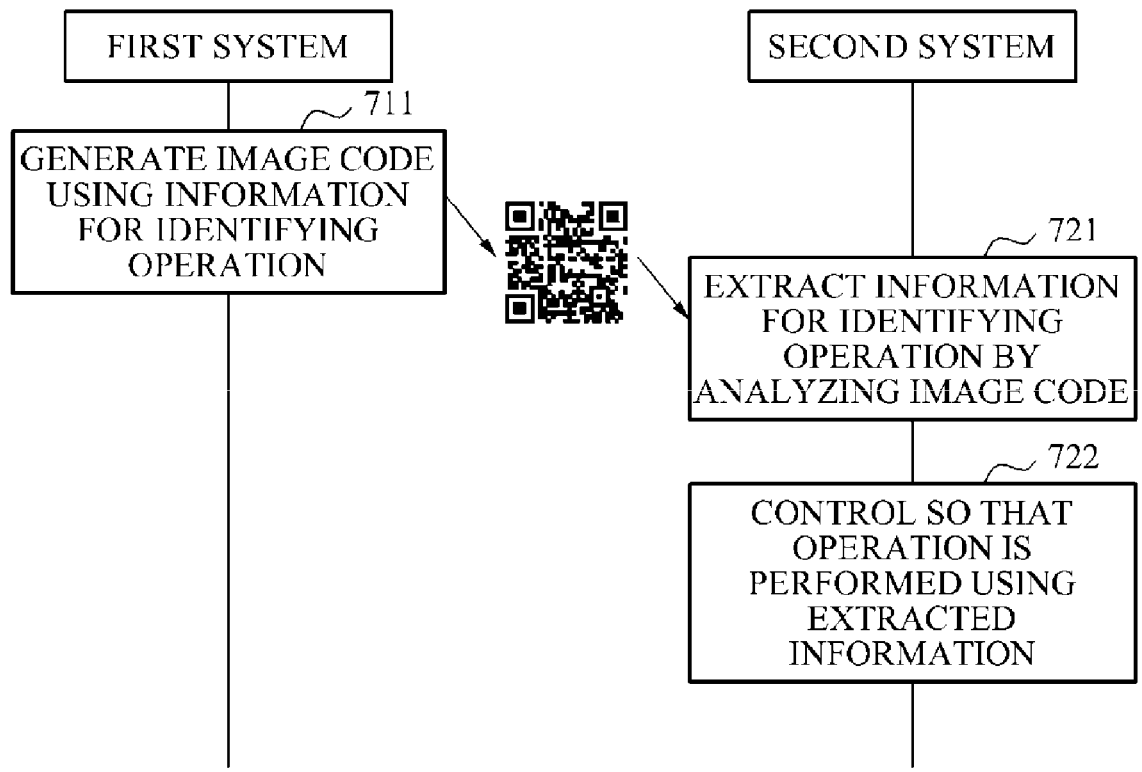
FIG. 7 is a flowchart illustrating a method of handing over an operation between systems using information for identifying the operation, according to an exemplary embodiment of the present invention.

FIG. 7 is a flowchart illustrating a method of handing over an operation between systems using information for identifying the operation, according to an exemplary embodiment of the present invention. Specifically, FIG. 7 illustrates the method of handing over an operation between two systems, that is, a first system and a second system. Here, the first system may refer to a system by which the user is currently performing the operation. The second system may refer to a system to be handed over the operation.

In operation 711, the first system may generate an image code using information for identifying the operation. Here, the information for identifying the operation may determine an identification level with respect to the operation. For example, the identification level of the information for identifying the operation may include three levels as follows.

(1) Level 1: The URL of a webpage currently displayed is extracted, and used as the information for identifying the operation.

(2) Level 2: The URL of the webpage currently displayed and information for identifying a content or service used by the user among contents and services of the webpage are extracted, and used as the information for identifying the operation.

(3) Level 3: The URL of the webpage currently displayed, the information for identifying a content or service used by the user among contents and services of the webpage, and information for identifying a currently used part of the corresponding content or service are extracted, and used as the information for identifying the operation.

However, the three foregoing types of levels are suggested only by way of example. Therefore, fewer levels or additional levels may be defined as necessary. For example, information for retrieving the corresponding webpage, such as "view:http://www.xxx.com," or information for retrieving an image of the corresponding webpage, such as "image:http://www.xxx.com," may be further included.

In addition to information for simply retrieving the corresponding content, information on an operation to be performed by the user may be included in the image code directly. For example, information for extracting and storing an image or a video from the corresponding webpage, for example in the form of "image:http://www.xxx.com/a.jpg" or "movie:http://www.xxx.com/b.mov," may be included in the image code. Also, the image code may further include information for determining whether to store the extracted image or video in the second system or in the web storage space related to the user, as the information for identifying the operation.

A range of the information for identifying the operation may be determined by setting up the aforementioned application or determined automatically according to the content or service currently used by the user.

Furthermore, although only a web operation has been explained thus far, an offline operation such as a simple word-processor operation may also be applied. For example, in case of an operation of drafting a simple document, an image code may be generated to include information on contents of the document along with information on a type of a word processor.

As aforementioned, the image code generated in the first system may be transmitted to the second system in various manners. For this, the first system may control the image code to be transmitted to the second system through a wired or wireless network, or to be displayed via a display device. That is, the first system may transmit the image code directly to the second system or, as described with reference to FIGS. 1 to 3, only display the image code through the display device so that the image code is input to the second system by the photographing device of the second system. In addition, the image code may be stored in the web storage space related to the user, as necessary, so that the second system receives the image code from the web storage space and uses the image code.

Accordingly, the second system may receive the image code from the first system, or generate and store an image photographed from the image code exposed through the display device of the first system in the form of an image file. Also, the second system may receive the image code from the web storage space related to the user as aforementioned.

In operation 721, the second system may extract the information for identifying the operation, by analyzing the image code. In operation 722, the second system may control the operation to be performed using the extracted information. As described in the foregoing example, the second system may extract the information for identifying the operation, such as "image:http://www.xxx.com" or "movie:http://www.xxx.com/b.mov." Also, the second system may display an image of a corresponding website or extract and store a video of a corresponding website.

In this case as well, at least one data of text, an image, an audio source, a video, and map information related to the operation may be stored in the web storage space related to the user by the second system. For this, the second system may control the at least one data to be stored in the web storage space related to the user.

As described to this point, with the system and method according to the exemplary embodiments, handover of an operation between systems may be achieved using a 2D image code such as a QR code or image code of a text hyperlink. More specifically, whereas one system generates and exposes an image code using a URL of a webpage exposed through a web browser, another system may extract the URL by photographing the image code and display the corresponding webpage, thereby handing over the operation to the user on the other system. In addition, the same effect may be achieved in such a manner that an image code is generated using information for identifying an operation and provided to another system and the other system extracts the information for identifying the operation from the image code.

The exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. In addition, the foregoing file system may be recorded in a non-transitory computer-readable recording medium.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A system for delivering information, the system comprising:

a first device comprising an image code generation unit and a display control unit, the first device being configured to access the Internet, the image code generation unit is configured to generate an image code using a uniform resource locator (URL) of a webpage, the image code is generated using information to identify an operation currently being performed by the first device to be executed by a second device and each of a plurality of levels of the operation for obtaining a service provided by the webpage, each of the plurality of levels indicating one or more steps required to complete the operation, each of the plurality of levels being specified by the first device, and the image code indicates (i) the operation currently being performed by the first device to be executed by the second device, (ii) the each of the plurality of levels of the operation, and (iii) an application type to be used for performing the operation, and the display control unit is configured to control the image code to be displayed, the image code is transmitted to the second device in a form of an image file or photographed by the second device, and when the image code is transmitted to the second device the second device extracts the URL of the webpage and performs the operation according to a selected one of the plurality of levels, wherein data associated with the service provided by the webpage is stored in a separate web storage space, and the operation is handed over between the first device and the second device using the data stored in the separate web storage space.

2. The system of claim 1, wherein the image code is generated to identify whether at least one information of a text, an image, an audio source, a video, and map information of the webpage to be displayed through the second device and stored in the separate web storage space associated with the second device.

3. The system of the claim 2, wherein the image code is generated to identify whether to store the information of a text, an image, an audio source, a video, and map information in the second system or in the separate web storage space.

4. The system of the claim 1, wherein image code generation unit is configured to generate the image code using information to identify content currently being accessed by the first device.

5. The system of the claim 1, wherein each level of content associated with the URL comprises:

content or service information of the URL of the webpage accessed by the first device;

further information on the content or service information of the URL of the webpage currently used by the first device among content or service information used by the first device; and a specific part of the content or service information of the URL of the webpage currently accessed by the first device and further including detailed information of the content or service information.

6. A system for delivering content or service information associated with a webpage from a first system to a second system, the first system comprising a first terminal receiving the content or the service and a second terminal to be handed over the content or the service information, the system comprising:

a photograph unit configured to generate an image photographed from an image code of the content or the service information in the form of an image file by using a uniform resource locator (URL), the image code being generated using information to identify an operation currently being performed by the first terminal to be executed by a second terminal and each of a plurality of levels of an operation for obtaining the content or service, each of the plurality of levels indicating one or more steps required to complete the operation, each of the plurality of levels being specified by the first terminal, the image code indicating (i) the operation currently being performed by the first terminal to be executed by the second terminal, (ii) the each of the plurality of levels of the operation, and (iii) an application type to be used for performing the operation;

an image code analysis unit configured to,
  analyze the image code by extracting the URL from the image code, and
  determine the information specifying each level of the operation; and a webpage display unit configured to selectively display the at least one of the plurality of levels of the webpage corresponding to the URL to the second system, the selectively displaying including performing the operation according to a selected one of the plurality of levels, wherein data associated with the content or service provided by the webpage is stored in a separate web storage space associated with the second terminal, and the operation is handed over between the first terminal and the second terminal using the data stored in the separate web storage space.

7. The system of claim 6, further comprising:
a data extraction unit configured to extract at least one data of a text, an image, an audio source, a video, and map information of the webpage; and
a storage control unit configured to control the at least one data to be stored in the separate web storage space associated with the second terminal.

8. A system to deliver information of a first terminal to a second terminal, the system comprising:
a non-transitory storage device;
an image code generation unit stored on the storage device and configured to generate an image code using a uniform resource locator (URL),
  the image code being generated using information to identify an operation currently being performed by the first terminal to be executed by the second terminal and each of a plurality of levels of the operation for obtaining a service provided by the webpage, each of the plurality of levels indicating one or more steps required to complete the operation, each of the plurality of levels being specified by the first terminal, and
  the image code indicates (i) the operation currently being performed by the first terminal to be executed by the second terminal, (ii) the each of the plurality of levels of the operation, and (iii) an application type to be used for performing the operation, and
wherein the image code is transferred to the second terminal in a form of an image file, and when the image code is transmitted to the second device the second device extracts the URL of the webpage and performs the operation according to a selected one of the plurality of levels, and
wherein data associated with the service provided by the webpage is stored in a separate web storage space, and the operation is handed over between the first terminal and the second terminal using the data stored in the separate web storage space.

9. The system of claim 8, further comprising:
a transmission unit to transmit the image code to the second terminal.

10. The system of claim 8, further comprising:
a display control unit configured to control the image code to be displayed via the first terminal,
wherein the image code displayed via the first terminal is transferred to the second terminal in a form of an image file to be captured by the second terminal.

11. The system of claim 8, wherein the image code comprises at least one data of a text, an image, an audio source, a video, and map information to be stored in the separate web storage space.

12. The system of claim 11, further comprising:
a photograph unit configured to capture the image code in a form of an image file, wherein the image code analysis unit is configured to extract the at least one data to analyze the image code stored in the image file.

13. The system of claim 8 further comprising:
an image code analysis unit stored on the storage device and configured to extract information to analyze the image code in response to the image code being generated in the second terminal; and
an operation control unit configured to control the image code to be displayed.

14. The system of claim 8, further comprising:
a receiving unit configured to receive the image code.

15. A method for delivering information, the method comprising:
generating, by a first display device, an image code using a uniform resource locator (URL) of a webpage, the image code is generated using information to identify an operation currently being performed by the first display device to be executed by a second display device and each of a plurality of levels of the operation for obtaining a service provided by a webpage, each of the plurality of levels indicating one or more steps required to complete the operation, each of the plurality of levels being specified by the first display device, the image code indicating (i) the operation, (ii) each of the plurality of levels of the operation, and (iii) an application type to be used for performing the operation;
controlling the image code to be displayed via the first display device; and
transmitting the image code to the second display device in a form of an image file, when the image code is transmitted to the second display device the second display device extracts the URL of the webpage and performs the operation according to a selected one of the plurality of levels,
wherein data associated with the service provided by the webpage is stored in a separate web storage space associated with the second display device, and the operation is handed over from the first display device the second display device using the data stored in the separate web storage space.

16. The method of claim 15, wherein the image code further comprises at least one information of a text, an image, an audio source, a video, and map information of the webpage and wherein the at least one information is stored in the separate web storage space.

17. A method of handing over an operation to be performed in another system, the method comprising:

generating, by a first terminal, an image code in a form of an image file by using a uniform resource locator (URL) of a webpage, the image code being generated using information to identify an operation currently being performed by the first terminal to be executed by a second terminal and each of a plurality of levels of the operation for obtaining a service provided by a webpage, each of the plurality of levels indicating one or more steps required to complete the operation, each of the plurality of levels being specified by the first terminal, the image code indicating (i) the operation currently being performed by the first terminal to be executed by the second terminal, (ii) each of the plurality of levels of the operation, and (iii) an application type to be used for performing the operation;

analyzing the image code by extracting the URL and the information specifying each level of the operation; and selectively displaying at least one of the plurality of levels of the webpage corresponding to the URL to the second terminal, the selectively displaying including performing the operation according to a selected one of the plurality of levels, wherein data associated with the service provided by the webpage is stored in a separate web storage space associated with the second terminal, and the operation is handed over between the first terminal and the second terminal using the data stored in the separate web storage space.

18. The method of claim 17, further comprising:

extracting at least one data of a text, an image, an audio source, a video, and map information of the webpage; and controlling the at least one data to be stored in the separate web storage space.

19. A method of handing over an operation being performed by another system, the method comprising:

generating an image code using information for identifying an operation currently being performed by the first system to be executed by a second system and each of a plurality of levels of the operation for obtaining a service provided by a webpage, each of the plurality of levels indicating one or more steps required to complete the operation, the operation being associated with a uniform resource locator (URL) of a webpage, each of the plurality of levels being specified by the first system, the image code indicates (i) the operation currently being performed by the first system to be executed by the second system, (ii) each of the plurality of levels of the operation, and (iii) an application type to be used for performing the operation, wherein the webpage is displayed to the second system, the second system extracts the URL from the image code and performs the operation according to a selected one of the plurality of levels, and wherein data associated with the service provided by the webpage is stored in a separate web storage space associated with the second system, and the operation is handed over between the first system the second system using the data stored in the separate web storage space.

20. The method of claim 19, wherein the image code further comprises at least one information of a text, an image, an audio source, a video, and map information related to the operation to be stored in the separate web storage space.

21. A non-transitory computer-readable recording medium having stored thereon a computer program that, when executed by a processor, configures the processor to:

generate, by a first display device, an image code using a uniform resource locator (URL) of a webpage, the image code is generated using information to identify an operation currently being performed by the first display device to be executed by a second display device and each of a plurality of levels of the operation for obtaining a service provided by a webpage, each of the plurality of levels indicating one or more steps required to complete the operation, each of the plurality of levels being specified by the first display device, the image code indicating (i) the operation currently being performed by the first display device to be executed by the second display device, (ii) each of the plurality of levels of the operation, and (iii) an application type to be used for performing the operation;

control the image code to be displayed via the first display device; and transmit the image code to the second display device in a form of an image file, when the image code is transmitted to the second display device the second display device extracts the URL of the webpage and performs the operation according to a selected one of the plurality of levels, wherein data associated with the service provided by the webpage is stored in a separate web storage space associated with the second display device, and the operation is handed over between the first display device and the second display device using the data stored in the separate web storage space.

* * * * *